United States Patent

[11] 3,613,872

| [72] | Inventor | James G. Donnelly<br>5314 McBride Ave., Cleveland, Ohio 44127 |
|---|---|---|
| [21] | Appl. No. | 814,994 |
| [22] | Filed | Apr. 10, 1969 |
| [45] | Patented | Oct. 19, 1971 |

[54] RECEPTACLE DEVICE FOR FOOD AND BEVERAGE PRODUCTS OR THE LIKE
8 Claims, 4 Drawing Figs.

[52] U.S. Cl. .................................................. 206/4,
220/8, 220/9 F, 220/17, 220/13
[51] Int. Cl. ........................................................ B65d 25/00,
A45c 11/20
[50] Field of Search.......................................... 126/261;
206/4; 220/9 F, 16, 17, 63, 97 F, 8; 221/96;
222/53, 131, 152, 183; 215/13

[56] References Cited
UNITED STATES PATENTS

| 583,676 | 6/1897 | Emery | 220/17 X |
|---|---|---|---|
| 1,014,911 | 1/1912 | Sheaffer | 220/17 |
| 1,300,712 | 4/1919 | Ferdon | 220/17 |
| 1,497,159 | 6/1924 | Porter | 220/17 X |
| 2,338,455 | 1/1944 | Petri | 220/17 |
| 2,591,578 | 4/1952 | McNealy et al. | 220/17 X |
| 2,954,893 | 10/1960 | Sayre | 206/4 X |
| 3,341,045 | 9/1967 | Sandler | 215/13 |
| 2,291,256 | 7/1942 | Rehrig et al. | 222/131 UX |
| 2,298,814 | 10/1942 | Weis | 220/97 F UX |

FOREIGN PATENTS

| 506,538 | 10/1954 | Canada | 206/4 |
|---|---|---|---|
| 981,322 | 5/1951 | France | 206/4 |
| 637,078 | 2/1962 | Canada | 220/8 |

*Primary Examiner*—Joseph R. Leclair
*Assistant Examiner*—Steven E. Lipman
*Attorney*—Teare, Teare & Sammon ABSTRACT: A lunchbox including a heat-insulating housing and a first container within the housing and in close-fitting engagement therewith. A second container adapted to contain food is suspended in the first container with its bottom spaced above the bottom of the first container to provide space for storing liquid. A faucet outside the first container communicates with the liquid compartment. The second container has a close-fitting cover and the housing has a removable cover. The housing cover has its bottom surface spaced from the second container cover to provide an additional compartment for food or utensils.

INVENTOR.
JAMES G. DONNELLY
BY
Teare, Teare & Sammon
ATTORNEYS

RECEPTACLE DEVICE FOR FOOD AND BEVERAGE PRODUCTS OR THE LIKE

BACKGROUND OF THE INVENTION

The present invention relates to receptacle devices, and more particularly relates to a portable heat-insulated receptacle device, such as a lunchbox or the like, for carrying and maintaining food and beverage products in a palatable condition as when freshly prepared and/or served.

Heretofore, various types of devices of the portable type have been provided for carrying liquid refreshment as well as for the storage of solid food products. Such devices have included portable lunchboxes equipped with a thermos bottle. In such arrangement, the thermos bottle has usually been carried in an upright position or in a horizontal position disposed within an individual compartment within the box or mounted within the hollow cover of the box. However, such arrangements have not been entirely satisfactory due to the fact that the thermos bottle was usually merely mounted in loose-fitting relation or clamped within the box so that the thermos bottle had a tendency to work loose when subjected to vibration or jarring, causing spillage of the contents and/or actual breakage of the bottle. Furthermore, such arrangements were generally of a deficient construction with relatively poor heat-insulating characteristics and had poor stability when overweighted by a filled thermos bottle or the like. Other compartmentalized types of portable containers have been provided for carrying food and/or beverage products but have generally been of a bulky and complex construction not affording an efficient means for carrying, in addition to food and beverage products, eating utensils and other appurtenances required during the consumption of a meal.

SUMMARY OF THE INVENTION

A receptacle device for carrying food and beverage products comprising, an outer housing having side, end and bottom walls made of a heat-insulating material, a unitary insert member or first container made of heat-conductive material disposed within the walls of said housing, a support tray or second container removably mounted within said housing on said insert member adapted to receive food products thereon, said support tray and said insert member together defining a chamber below said support tray adapted to receive a heat transfer medium therein, and closure means for said housing adapted to enclose said support tray. The insert member is of a hollow construction adapted to be removably mounted within said housing and said support tray is generally complementary shaped to said insert member adapted to be removably mounted within said insert member and supported therein by a generally complementary constructed endless, laterally projecting flange arrangement provided on the insert member and support tray, respectively. The support tray is of a compartmentalized construction and defines with the insert member a chamber for receiving a heat transfer medium, such as hot or cold liquids, for maintaining the food products disposed on the support tray in a heated or cooled condition, as desired. The device is provided with a closure means including an inner cover member removably mounted on the support tray adapted to receive eating utensils and other appurtenances thereon. An outer cover member is removably mounted on the housing adapted to enclose the inner cover for the support tray and to provide a heat insulation for the housing. A faucet means communicates the interior of the chamber with the exterior of the housing for selectively controlling the discharge of fluid material from the interior of said chamber.

By the foregoing arrangement, there is provided a novel construction for a portable receptacle device, such as a lunchbox, which has improved heat-insulating characteristics for carrying food products, such as sandwiches, foods, pastries, meats, hot meals, cold or frozen meals, in addition to carrying beverage products either in hot or cold condition, such as hot soups, hot or cold coffee, ice tea, hot tea or the like. In addition to carrying such food and beverage products, the device provides a novel arrangement for carrying eating utensils in a compact and efficient manner without interference to the stored food and beverage products. The device is of a multiple part yet simple and rugged construction, the components of which can be quickly and easily removed for cleansing and/or repair, as desired. The device is of a construction to impart maximum heat transfer for heating or cooling the food products for maintaining the same in a palatable condition for consumption after prolonged periods of time in hot or cold environmental conditions. The device is of a lightweight, rigid construction which affords maximum protection against spoilage and/or damage to the food or beverage products contained therein. In addition, the device is constructed and arranged so as to have a relatively low center of gravity so as to prevent upsetting of the device during normal usage thereof.

DESCRIPTION OF THE PREFERRED EMBODIMENTS

Figure 1:
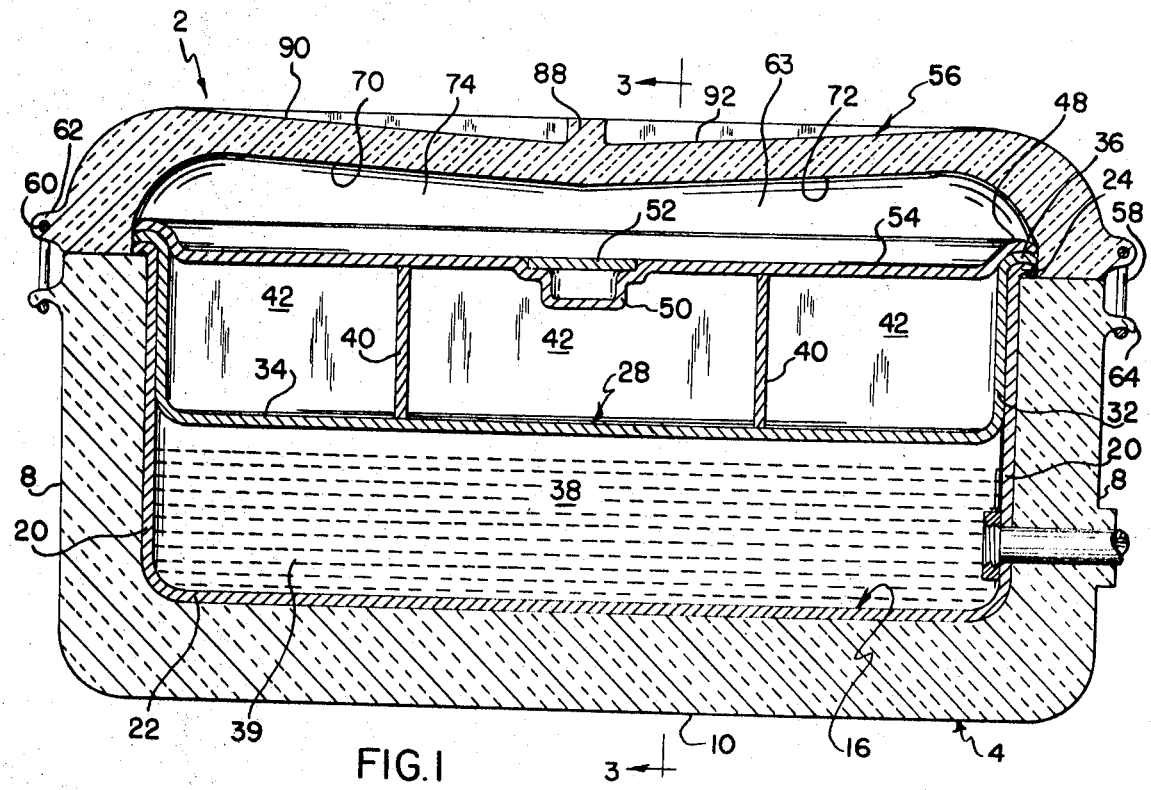
FIG. 1 is a fragmentary vertical section view of the receptacle device made in accordance with the invention.

Referring again to the drawings and in particular to FIG. 1 thereof, there is illustrated the receptacle device 2 of the invention. As shown, the device includes a hollow, polygonal housing 4 made of a generally rigid, heat-insulating material. Preferably, the housing is made of a lightweight, porous foam material, for example, the material is preferably expanded polyurethane or polystyrene, although other suitable heat-insulating materials may be utilized. The housing 4 is preferably of a polygonal, such as rectangular shape, defined by a pair of oppositely disposed sidewalls 6, a pair of oppositely disposed end walls 8 and an interconnecting generally flat bottom wall 10 integrally connected to provide the construction shown. The side 6 and end 8 walls provide an endless peripheral shoulder 12 adjacent their upper ends thereof for providing a support surface, as will hereinafter be more fully described.

The housing 4 is of an open top, as at 14, construction adapted to slidably receive therein a first container member 16 of a unitary, one-piece construction. The insert member 16 is preferably made of a corrosion-resistant, heat-conductive material, such as stainless steel, aluminum or the like. As shown, the insert member 16 is preferably of a polygonal, such as rectangular, shape defined by a pair of oppositely disposed sidewalls 18, a pair of oppositely disposed end walls 20, and an interconnecting generally flat bottom wall 22. The side 18 and end 20 walls are provided adjacent their upper ends with an endless laterally extending flange 24 which preferably has an arcuate shape in vertical cross section. The flange 24 extends laterally outwardly by an amount sufficient to provide a support for the insert member 16 when engaged with the corresponding shoulder 12 provided on the housing 4 in the installed position thereof. Accordingly, the insert member 16 is dimensioned in height, lengthwise and widthwise directions so as to be slidably, yet snugly received within the interior of the housing 4 which may be preformed by suitable molding techniques as are known in the art.

The insert member 16 is of an open top, as at 26, construction adapted to slidably receive therein a second container or support tray 28. The support tray 28 is also preferably made of a corrosion-resistant and heat-conductive material, such as stainless steel, aluminum or the like. The tray is preferably of a polygonal, such as rectangular, shape defined by a pair of oppositely disposed sidewalls 30, a pair of oppositely disposed end walls 32 and a generally flat interconnecting bottom wall 34. The tray is further provided with an endless laterally extending flange 36 adjacent the upper ends of the side 30 and end 32 walls and has an arcuate shape in vertical cross section generally corresponding to that of the flange 24 on the insert member 16. Accordingly, the flange 36 may be disposed in tight-fitting frictional engagement over the flange 24 to provide an effective heat seal.

In the invention, in the installed position of the support tray 28 the bottom wall 34 thereof defines with the walls of the insert member 16 a chamber 38 for receiving a heat transfer medium, as at 39, therein. Preferably, such heat transfer medium is a hot or cold liquid medium, such as hot coffee, hot tea, cold coffee, cold tea or other such beverage product.

In the embodiment shown, the support tray 28 may be of a compartmentalized construction defined by one or more transverse partition members, as at 40, for separating the tray into two or more compartments, as at 42, for storing food products therein. The partition members 40 may be of a removable construction so as to quickly vary the size and/or number of the compartments, as desired. By this arrangement, the heat transfer medium 39 contained within the chamber 38 effectively acts to transmit heat or cold to the food products contained on the support tray 28. The interconnecting flange construction 24 and 36 provides an effective heat seal for maintaining the heat transfer characteristics entirely within the interior of the support tray 28 for maintaining the food products in a palatable condition. In addition, with the inner engaged relation of the flanges 24 and 26 and their supported relation on the shoulder 12 of the housing 4, the insert member 16 and/or the support tray 28 may be quickly and easily removed for cleansing and/or repair, as desired.

In the invention, the support tray 28 is of a height, as at H, sufficient to be disposed downwardly well within the height H' of the insert member 16 in the installed position thereof. Preferably, the support tray 28 has a height more than half as great as the height of the insert member 16. For example, the height H of the support tray may be 2½ inches while the height H' of the insert member 16 is 4 inches. By this arrangement, the geometric center of the chamber 38 defined by the members is disposed generally below the general horizontal axis X–X (FIG. 3) of the housing 4 so that the device has a relatively low center of gravity when the chamber 38 is filled with the heat transfer medium. This arrangement provides optimum heat transfer characteristics while preventing the device from readily upsetting during normal usage thereof.

The support tray is of an open top, as at 44, construction adapted to receive thereon an inner cover member 46. The cover member 46 is preferably of a polygonal, such as rectangular, shape dimensioned so as to fit in closing relation over the support tray 28. In the form shown, the cover 46 is of a generally flat construction having a raised flange 48 of endless construction disposed adjacent the periphery thereof. The flange 48 is preferably of an arcuate construction formed generally complementary to the flange 36 on the support tray 28 so as to provide a frictional inner engagement therebetween which acts as a heat seal for the interior of the support tray. The cover 46 may be provided with a centrally disposed, annular stepped depression, as at 50, which is traversed by a crosspiece 52 to provide a handlelike arrangement for lifting the cover off the support tray. The upstanding endless flange 48 defines interiorly thereof a generally flat, recessed base portion 54 which functions as a receptacle for eating utensils or other appurtenances which may be employed during the consumption of a meal. The cover is preferably made of the same type of material as the insert member 16 and the support tray 28 for the purposes, as aforesaid.

Figure 4:
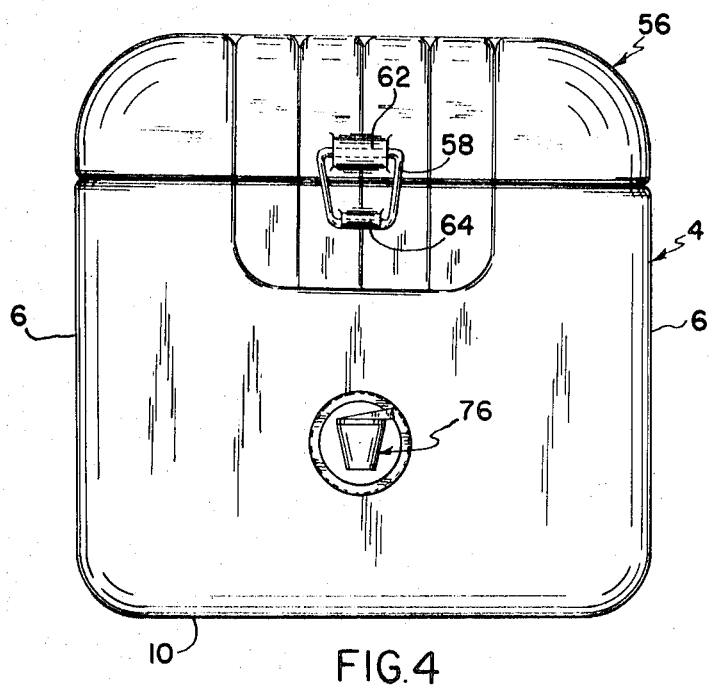
FIG. 4 is an end view of the receptacle device looking from the right-hand side of FIG. 1.

As best seen in FIGS. 1 and 4, the housing 4 may be provided with an outer insulating cover member 56 which seats on the confronting peripheral shoulder 12 in the installed position thereof. The cover 56 may be detachably mounted on the housing by means of a pair of closed latch members 58 which may be pivotally connected, as at 60, to projectionlike bosses 62 made integral with the cover. The latch member 58 may be disposed for snap-acting locking engagement with laterally projecting bosslike projections 64 made integral with the end walls 8 of the housing 4. By this arrangement, the cover member 56 may be quickly installed or removed by simple actuation of the latch members 58.

The cover member 56 is preferably made of the same material as the housing 4 and has a generally inverted U-shaped configuration in vertical section (FIG. 3) defined by a pair of upwardly and outwardly tapered recess portions 70 and 72 (FIG. 1) which extend toward the opposed ends of the cover member from the center thereof. Such recessed tapered construction provides a clearance area 74 above the support tray 46 for storing items, such as eating utensils or the like, thereon, as desired.

Figure 3:
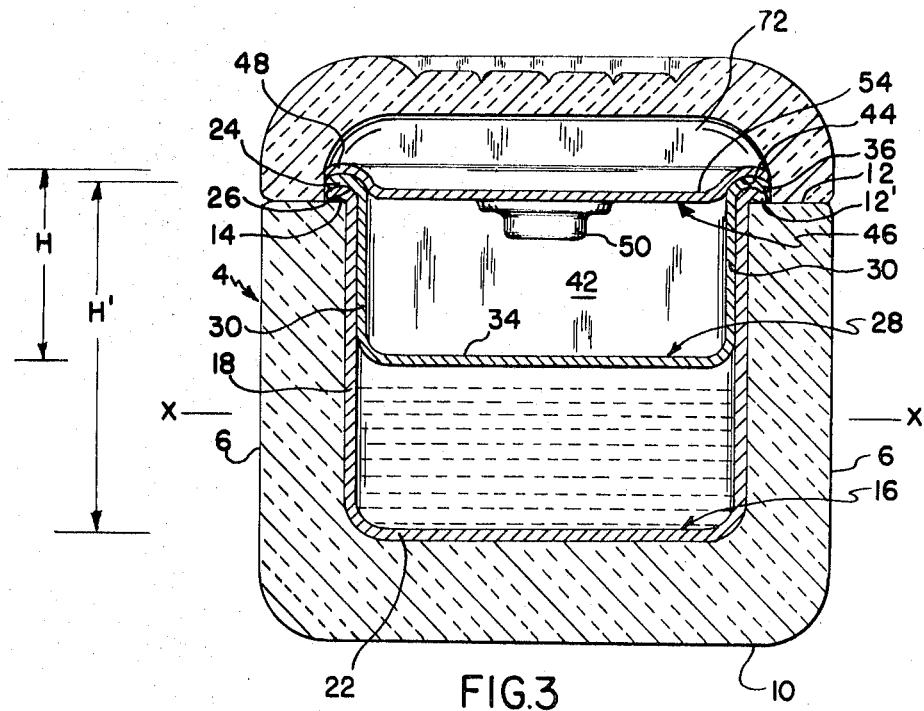
FIG. 3 is a vertical section view taken along the line 3—3 of FIG. 1.

As best seen in FIGS. 1 and 3, the wall thickness of the cover member 56 adjacent the shoulder 12 of the housing 4 is less than the corresponding thickness of the walls 6 and 10 of the housing to provide an insetlike support surface 12' for supporting the flanges 24, 36 and 48 of the insert 16, tray 28 and cover 46 members, respectively.

Figure 2:
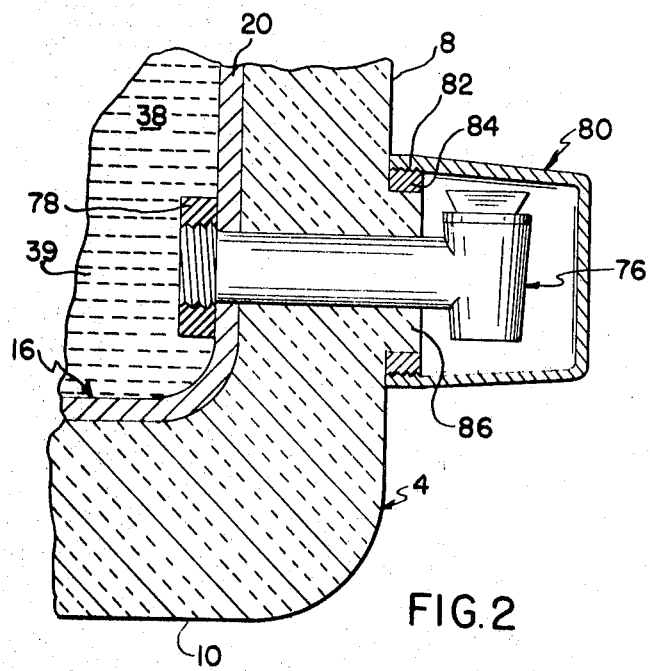
FIG. 2 is an enlarged fragmentary section view showing a portion of the receptacle of FIG. 1, and illustrating the faucet construction of the invention.

As best seen in FIG. 2, a spigot or faucet 76 communicates the interior of the chamber 38 with the exterior of the housing 4. The faucet 74 may be made from any suitable material, such as metal, plastic or the like, which is secured through suitable mounting holes in the housing 4, and insert member 16. The faucet may be secured from the inside of the insert member 16 by a fastener 78, such as a nut or the like, to effectively hold the insert member 16 within the housing 16. By this arrangement, the insert member 16 and the faucet 76 may be removed, as a unit, or separately, as desired.

As shown, the faucet 76 may be enclosed by a protective cover 80 (FIG. 2), such as a drinking cup or the like, which may be threadably connected, as at 82, to a threaded collar 84 which, in turn, may be fixedly secured to an integral boss 86 on the end wall 8 of the housing 4. By this arrangement, the cup 80, for example, may be readily utilized for consumption of liquids discharged from the faucet 76 while also providing a protective cover therefor when not in use.

As will be seen in FIG. 1, the outer cover member 56 may be provided with a suitable handle or handgrip portion 88 which may be made integral with the cover. In the form shown, the handle 88 may be defined by recess portions 90 and 92 which may be tapered so as to extend generally paralleled to the planes parallel the undercut recess portions 70 and 72, respectively, thereof. It will be understood, however, that other suitable handle arrangements may be utilized, as desired.

I claim:

1. A receptacle device for carrying food and beverage products comprising, a hollow housing formed entirely of generally rigid, polymeric foam material, said housing being defined by generally flat integrally connected side, end and bottom walls including upper ends which together form an endless peripheral shoulder defining an open top for said housing, a hollow cover member detachably mounted on said housing being formed entirely of generally rigid, polymeric foam material and including side and end walls adapted for seated engagement on said peripheral shoulder of said housing and defining with said housing an enclosed insulated storage chamber in the installed position thereof, an open-top first container made of heat-conductive material including side, end and bottom walls adapted to be received through the open top of said housing, said first container slidably inserted in formfitted relation within the interior of said housing having the side, end and bottom walls thereof disposed in close-fitting contact with the corresponding side, end and bottom walls of said housing, a foreshortened, open-top second container made of heat-conductive material including side, end and bottom walls adapted to be received through the open top of said first container, said second container slidably inserted and suspended in partially formfitted relation within the interior of said first container having the side and end walls thereof disposed in close-fitting contact with the corresponding side and end walls of said first container and having its bottom wall spaced above said bottom wall of said first container to define a beverage product storage space therebetween, a coverlike container made of heat-conductive material including side, end and bottom walls adapted to be received through the open top of said second container, said coverlike container being foreshortened with respect to said second container and suspended in partially formfitted relation adjacent the open top of said second container having its bottom wall spaced above said bottom wall of said second container defining a food product storage space therebetween, each of said containers including laterally extending, peripheral flanges projecting outwardly therefrom adjacent said open top thereof, said flanges being of a complementary-shaped configuration for inner fitting seated engagement with one another in the installed position thereof to provide a seal between the respective food and beverage products storage spaces, said cover member including recessed portions to provide clearance above said coverlike container to provide additional food products storage space, the wall thickness of said cover member being less than the wall thickness of said housing adjacent said shoulder forming an insetlike support surface for seatingly supporting said flange of said first container, said cover member and said support surface clampingly coacting with one another to clamp said flanges in interlocking relation in the installed position of said containers and said cover member, and a faucet assembly mounted on the exterior of said housing and connecting the exterior of said device in fluid communication with said beverage product storage space for dispensing said beverage product from said device.

2. A receptacle device in accordance with claim 1, wherein said flanges are of an arcuate shape in cross section adapted for frictional inner fitting engagement with one another in the installed position thereof.

3. A receptacle device in accordance with claim 1, wherein the height of said second container is less than the height of said first container to provide a relatively low center of gravity for said housing when said beverage product storage space is occupied.

4. A receptacle device in accordance with claim 3, wherein the height of said second container is more than half of the height of said first container.

5. A receptacle device in accordance with claim 1, wherein said second container includes at least one transverse partition member separating said container into at least two compartments for holding said food products.

6. A receptacle device in accordance with claim 1, wherein said faucet assembly includes a faucet member, and a cup is removably attached to said housing and encloses said faucet member.

7. A receptacle device in accordance with claim 1, wherein said cover member is of a generally inverted U-shaped configuration when viewed in vertical section, being defined by a pair of upwardly and outwardly tapered recess portions extending toward the opposed ends thereof to provide said clearance above said coverlike container.

8. A receptacle device in accordance with claim 1, wherein said flange of said first container is disposed in inner fitting locking relation within said flange of said second container, and said flange of said second container is disposed in inner fitted locking relation within said flange of said coverlike container to prevent relative movement with respect to said housing in the installed position of said cover member.